US009298768B2

(12) United States Patent
Varakin et al.

(10) Patent No.: US 9,298,768 B2
(45) Date of Patent: Mar. 29, 2016

(54) SYSTEM AND METHOD FOR THE PARALLEL EXECUTION OF DATABASE QUERIES OVER CPUS AND MULTI CORE PROCESSORS

(75) Inventors: Konstatin Varakin, Haifa (IL); Ami Gal, Kfar HaOranim (IL); Oz Katz, Kfar HaOranim (IL)

(73) Assignee: SQREAM TECHNOLOGIES LTD, Ramat Gan (IL)

( * ) Notice: Subject to any disclaimer, the term of this patent is extended or adjusted under 35 U.S.C. 154(b) by 0 days.

(21) Appl. No.: 13/811,155

(22) PCT Filed: Jul. 18, 2011

(86) PCT No.: PCT/IL2011/000565
§ 371 (c)(1),
(2), (4) Date: Jan. 18, 2013

(87) PCT Pub. No.: WO2012/025915
PCT Pub. Date: Mar. 1, 2012

(65) Prior Publication Data
US 2013/0117305 A1    May 9, 2013

Related U.S. Application Data

(60) Provisional application No. 61/366,179, filed on Jul. 21, 2010.

(51) Int. Cl.
*G06F 17/30* (2006.01)
*G06F 9/50* (2006.01)

(52) U.S. Cl.
CPC ........ *G06F 17/30445* (2013.01); *G06F 9/5072* (2013.01); *G06F 17/30519* (2013.01); *G06F 2209/509* (2013.01); *G06F 2209/5017* (2013.01)

(58) Field of Classification Search
CPC .................................................. G06F 17/30445
See application file for complete search history.

(56) References Cited

U.S. PATENT DOCUMENTS 5,495,606 A     2/1996   Borden et al.
2005/0131893 A1  6/2005  Von Glan
2006/0218123 A1  9/2006  Chowdhuri et al.

OTHER PUBLICATIONS

He et al., "Relational Query Co-Processing on Graphics Processors", Retrieved on the Internet<URL: www.cs.ust.hkl-psander/docs/jointods.pdf> p. 8-9, 18-22 (2009).
International Search Report and Written Opinion dated Dec. 12, 2011 in corresponding International Application No. PCT/IL2011/000565.
He et al., "Relational Joins on Graphics Processors", SIGMOD'08, Vancouver, BC, Canada (2008).

*Primary Examiner* — William Spieler
(74) *Attorney, Agent, or Firm* — Browdy and Neimark, PLLC

(57) ABSTRACT

The invention relates to a system for parallel execution of database queries over one or more Central Processing Units (CPUs), and one or more Multi Core Processor, (MCPs), the system comprises (a) a query analyzer for dividing the query to plurality of sub-queries, and for computing and assigning to each sub-query a target address of either a CPU of an MCP; (b) a query compiler for creating an Abstract Syntax Tree (AST) and OpenCL primitives only for those sub-queries that are targeted to an MCP, and for conveying both the remaining sub-queries, and the AST and the OpenCL code to a virtual machine, and (A) a Virtual Machine (VM) which comprises: a task bank, a buffers; a scheduler. The virtual machine combines said sub-query results by the CPUs and said primitive results by said MCPs to a final query result.

8 Claims, 3 Drawing Sheets

SYSTEM AND METHOD FOR THE PARALLEL EXECUTION OF DATABASE QUERIES OVER CPUS AND MULTI CORE PROCESSORS

FIELD OF THE INVENTION

The present invention relates to the field of data bases and data sets queries. More particularly, the invention relates to boosting large and/or ongoing data queries utilizing one or more central processing units and one or more hardware that include hundreds of cores, such as graphical processing units.

BACKGROUND OF THE INVENTION

A typical database/data set is an organized collection of data for one or more uses, in digital form. In recent years databases have become essential ingredients in almost every system. Digital databases are managed using a Database Management System (DBMS). The DBMS is a software which operates a database by providing retrieval (query) services, manipulation and update services, management and administration services, storage, access, security, backup and other features. Typically, a DBMS is categorized based on the database model it supports, such as relational or eXtensible Markup Language (XML), the type of computer it supports, such as a server cluster or a mobile phone, the storage sets it uses, the memory type it uses, such as in-memory databases flash memory databases, the query language that accesses the database, such as Structured Query Language (SQL) or XQuery or No-SQL query protocols or other data query protocols. Several known DBMSs cover more than one entry in these categories, commonly, supporting multiple query languages.

A Query language is a high-level language which is specifically designed to handle the interactions with a database. The database queries are constructed using a query language, and are then used to access and get necessary information from the database. More specifically, a database query is a piece of code which is sent to a Central Processing Unit (CPU) for the purpose of retrieving information from the database. In other terms, a database "query" is a standard database "question" asked from the DBMS by a third party, namely, application that uses the DBMS. The result of the query is the retrieved information which is returned by the DBMS.

In recent years, companies invest a huge amount of time and money in order to improve their software and hardware performances, particularly in the manner by which they efficiently manage their databases. Performance improvement is the concept of modifying a particular process or system to increase its efficiency. In DBMS, performance improvement reduces the query time, and therefore, anticipated results are received faster. For many commercial applications (for example, Algo-Trading, Complex Event Processing (CEP), Reporting and BI (Business Intelligence) etc.) receiving query results fast is a crucial factor in their operability. Generally, a 50 to 100 percent improvement in the performance is considered a very significant improvement.

Parallel processing is the ability to carry out multiple operations or tasks simultaneously. One of the most common ways to achieve performance improvement is to employ parallel processing while executing a query. Parallel queries allow breaking a single query into multiple subtasks and executing them on multiple general-purpose Central Processing Units (CPUs) in a multiprocessors computer. While such manner of operation increases speed it requires more resources, suffers excessive power consumption, and occupies a large storage space.

Parallel processing of queries is common in the art, and such parallel processing is obtained by the handling of queries by several CPUs, typically, each having multiple cores (core is an instruction processing unit).

Moore's law describes a long-term trend in the history of computing hardware. The number of transistors that can be placed inexpensively on an Integrated Circuit (IC) is doubled approximately every two years. The capabilities of many digital electronic devices are strongly linked to Moore's law, e.g., processing speed, memory capacity, sensors and even the number and size of pixels in digital cameras. All of these are improving at (roughly) exponential rates as well. The hardware limitation accurately described by Moor's law dictates a limitation over the number of CPUs that may participate in a parallel query. Parallel queries utilizing CPUs are also limited by the relatively low number of cores in each CPU.

A Graphics Processing Unit (GPU), also known as a Visual Processing Unit (VPU) is a specialized microprocessor that offloads and accelerates 3D or 2D graphics rendering from the microprocessor (i.e., CPU). More specifically, the GPU has been particularly designed to process graphics and streams for visual aspects (such as movies). It is used in embedded systems, mobile phones, personal computers, workstations, and game consoles. Modern GPUs which comprise hundreds of cores that operate in parallel are very efficient in manipulating computer graphics, and their highly parallel structure makes them more effective than general-purpose CPUs for a range of complex algorithms. More than 90% of new desktop and notebook computers have integrated GPUs. However, GPUs are usually designed to operate with a unique and limited input structure known as "stream", but they can also operate in other common paradigms. Stream processing typically allows high throughput and high latency processing. The GPU is typically connected through a PCI bus or its derivatives, for example, a PCIe bus. Still, there are GPUs that are provided within the CPU die (typically call on-die GPU), such as AMD Fusion, or Intel GMA. Furthermore, Intel recently introduce the KNIGHTS-FERRY/CORNER, which is a processor based on MIC (Many Integrated Cores) architecture, and which is connected to a PCI bus. Although the KNIGHTS-FERRY/CORNER is specifically designed for stream processing, still it contains hundreds of cores, and it is capable of handling large amount of simultaneously running threads. Hereinafter, the term MCP (Multi Core Processor) refers to all the above versions of GPUs, and to other multi core processing units that are connected to the PCI bus, or multiple of such MCPs distributed on the network and connected by MPI (Message Passing Interface) or any other protocol that connects machines on the network.

Stream processing is a computer programming paradigm, which allows some applications to more easily exploit a limited form of parallel processing. Such applications can use multiple computational units, such as the floating point units on a GPU, or the Field Programmable Gate Arrays (FPGAs), without explicitly managing allocation, synchronization, or communication among those units. The stream processing paradigm simplifies parallel software and hardware by restricting the parallel computation which is performed. Given a set of data having a stream format, a series of operations is applied to each element in the stream.

In graphical operations requiring massive vector operations, stream processing yields several orders of magnitude faster performance than a general-purpose CPU. Stream processing is essentially a compromise, driven by a data-centric model that works very well for traditional GPU-type applications (such as image, video and digital signal processing) but less so for general-purpose CPUs with more randomized data access (such as databases). By sacrificing flexibility, GPUs allow easier, faster and more efficient execution. As noted, a typical GPU comprises several hundreds of cores, and therefore the parallel operation of the GPU is significantly accelerated for those applications that are adapted to operate in a stream structure. Unfortunately, thus far there are many applications that are not adapted for operation on GPU, and one of these applications is the processing of database queries. Therefore, thus far database queries can operate in parallel only with CPUs, which as said employs at most very few cores in parallel. Database query parallel execution which uses a GPU could not be performed thus far, and as a result, obviously the advantages of using hundreds of cores in parallel could not be obtained.

There have been tries by the art to provide SQL like data processing on GPUs. The main drawbacks of all said previous tries are (a) they require a separate off-line data storage, in addition to the main data storage, such as they require a separate copy of the data stored in the MSSQL Server. This is a very significant drawback. The maintaining of two separate databases very disadvantageous in terms of speed, because the synchronization between the two databases imposes very sever CPU and network usage, and typically during such a synchronization, the DBMS is prevented from serving the users. More specifically, such an operation prevents working on real time data (OLAP—On Line Analytical Processing). The advantage of the present invention approach will become clear in the explanation relating to the virtual machine and compiler actions; (b) the lack of non intrusiveness operation; (c) the lack of non invasiveness operation; (d) the proposed algorithms do not cover all standard SQL operators;

In the context of the present invention, the term "non intrusive" means that the system of the present invention does not require changes in the conventional third party applications, specifically, application code, application architecture, application database structure, methodology of writing the application code and design, etc. The term "automatic" means that the system automatically adapts its operation to the architecture and database of the third party application, architecture and type of the server database, and typically there is no need to manually change the technology code to do it.

The following prior art publications describe such prior art tries to perform SQL primitives on a GPU. All said publications suffer from the abovementioned drawbacks:
1. Bakkum et al, *Accelerating SQL Database Operations on a GPU with CUDA*, GPGPU-3 Mar. 14, 2010, Pittsburg, Pa., USA;
2. Tsakalozos et al, *Using the Graphics Processor Unit to RealizeData Streaming Operations*, MDS'09, Nov. 30, 2009 Urbana Champaign, Ill., USA;
3. Volk et al, GPUBased Speculative Query Processing for Database Operations, (http://www.vldb.org/archives/workshop/2010/proceedings/files/vldb 2010_workshop/ADMS 2010/adms10-volk.pdf).

Engineers continue to search for new ways to design CPUs that settle a little quicker or use slightly less energy per transition, pushing back those limits, producing new CPUs that can run at slightly higher clock rates. However, recent years improvements, hardly satisfies the speed requirements for receiving results from queries over large databases.

Open Computing Language (OpenCL) is a framework for writing programs that execute across heterogeneous platforms consisting of CPUs, GPUs, and other processors. OpenCL includes a language for writing kernels (functions that execute on OpenCL devices), plus APIs that are used to define and control the platforms. OpenCL provides parallel computing using task-based and data-based parallelism. OpenCL enables any application to access a GPU even for a non-graphical computing. Thus, OpenCL extends the power of the GPU beyond graphics, enabling general-purpose computing on a GPU having plurality of cores. For the sake of brevity, the application refers herein to an OpenCL. The term OpenCL, when refers herein relates to the OpenCL or Cuda or Microsoft C++AMP language and their derivatives, for example, libraries like Thrust, Cudapp, Oclpp, etc. Moreover, the term "OpenCL" refers herein to any framework or programming language for working with parallel computational hardware connected through a PCI bus (like NVIDIA/ATI GPUs or Intel Knights Ferry/Knights Corner or Intel's next generations. Therefore, hereinafter, for the sake of brevity reference in the description is made to "OpenCL". However, this term in this description refers to any platform which is capable of carrying out processing over both one or more CPUs and one or more MCPs, for example, Nvidia's CUDA, Microsoft's C++AMP and their derivatives: Thrust, oclpp, cudapp, etc.

It is therefore an object of the present invention to provide a system which is adapted to query a dataset, by simultaneously utilizing a central processing unit (CPU)—which typically applies several cores in parallel, and a Multi Core Processor (MCP)—which typically applies hundreds of cores in parallel.

It is another object of the present invention to boost performance in large queries for databases and for data sets that are not residing on DBMS, such as any type/format of SGML/XML object, any type/format of text data objects, propriety and binary data objects, No-SQL and alike data sets, Search engines like Lucene.

It is still another object of the present invention to provide a system in which the throughput of DBMS is significantly increased in terms of queries per hour and/or per specific query It is another object of the present invention to provide a system for querying a database which is an add-on, and low cost, and which is based on a heterogeneous platform (CPU plus any MCP hardware connected to PCI bus).

It is another object of the present invention to increase the efficiency of querying a database in terms of time, power, volume, and hardware resources allocation.

It is still another object of the present invention to provide the above system, which may be formed as a non-intrusive and non-invasive, that does not require changing the way that a database consuming application was written, is written or will be written.

It is still another object of the present invention to provide a database querying system which operates in parallel with both one or more CPUs, and one or more MCPs.

Other objects and advantages of the invention will become apparent as the description proceeds.

SUMMARY OF THE INVENTION

The invention relates to a system for parallel execution of database queries over one or more Central Processing Units (CPUs), and one or more Multi Core Processors, (MCPs), the system comprises: (a) a query analyzer for receiving a query, dividing the query to plurality of sub-queries, and for computing and assigning to each sub-query a target address of either a CPU of a MCP, whichever is more efficient for executing said sub-query; (b) a query compiler for receiving said sub-queries from said query analyzer, creating an Abstract Syntax Tree (AST) and OpenCL primitives only for those sub-queries that are targeted to an MCP, and for conveying both the remaining sub-queries, and the AST and the OpenCL code to a virtual machine; and (A) Virtual Machine (VM) which comprises: (c.1) a task bank for containing said received sub-queries that are targeted to one or more CPUs for DBMS execution, and said received primitives that are targeted to said one or more MCPs; (c.2) one or more buffers for containing data resulting from sub-queries executions by said one or more CPUs; and (c.3) a scheduler for coordinating said primitive execution at the one or more MCPs, depending on data readiness in said one or more buffers as a result of said sub-queries execution by the one or more CPUs; wherein said virtual machine also combines said sub-query results by the CPUs and said primitive results by said MCPs to a final query result.

Preferably, the system further comprises a query interceptor for intercepting a query, and for conveying the query to said analyzer.

Preferably, the interceptor is located within the DBMS or is external to said DBMS.

Preferably, the system further comprises an analyzer database, said analyzer database is in communication with said analyzer, and containing data for assisting the analyzer in the assigning of said target addresses to said sub-queries.

Preferably, the data which is stored in said analyzer database contains indexes, columnar statistics, and distributions.

Preferably, the data readiness in said one or more buffers is the case when a buffer for specific query becomes full of data from the DBMS, or when the DBMS has completed its transfer of data to said buffer Preferably, the system further comprises a pre-compiled cache for storing MCP primitives that have already been compiled during previous runs, thereby saving compilation time by the query compiler.

Preferably, the system further comprises a Hardware Abstraction Layer (HAL) for monitoring operation of all said MCPs and their various cores, determining those that are is available for performing new tasks, and reporting observations results to said query analyzer.

The invention further relates to a method for the parallel execution of database queries over one or more Central Processing Units (CPUs), and one or more Multi Core Processors, (MCPs), the method comprises: (a) receiving a query; (b) dividing the query to plurality of sub-queries, and computing and assigning to each sub-query a target address of either a CPU of a MCP, whichever is more efficient for executing said sub-query; (c) creating from said plurality of sub-queries an Abstract Syntax Tree (AST) and OpenCL primitives only for those sub-queries that are targeted to an MCP, and conveying both the remaining sub-queries, and the AST and the OpenCL code to a virtual machine; and (d) storing within a task bank said sub-queries that are targeted to one or more CPUs for DBMS execution, and said received primitives that are targeted to said one or more MCPs; (e) providing one or more buffers for containing data resulting from sub-queries executions by said one or more CPUs; (f) coordinating the execution of said primitives at the one or more MCPs, depending on data readiness in said one or more buffers, as a result of said sub-queries execution at the one or more CPUs; and (g) combining said sub-query results by the CPUs and said primitives results by said MCPs to a final query result.

BRIEF DESCRIPTION OF THE DRAWINGS

In the drawings:
FIG. 1b illustrates in slightly more details the structure of the system of FIG. 1a.

DETAILED DESCRIPTION OF PREFERRED EMBODIMENTS

Figure 1A:
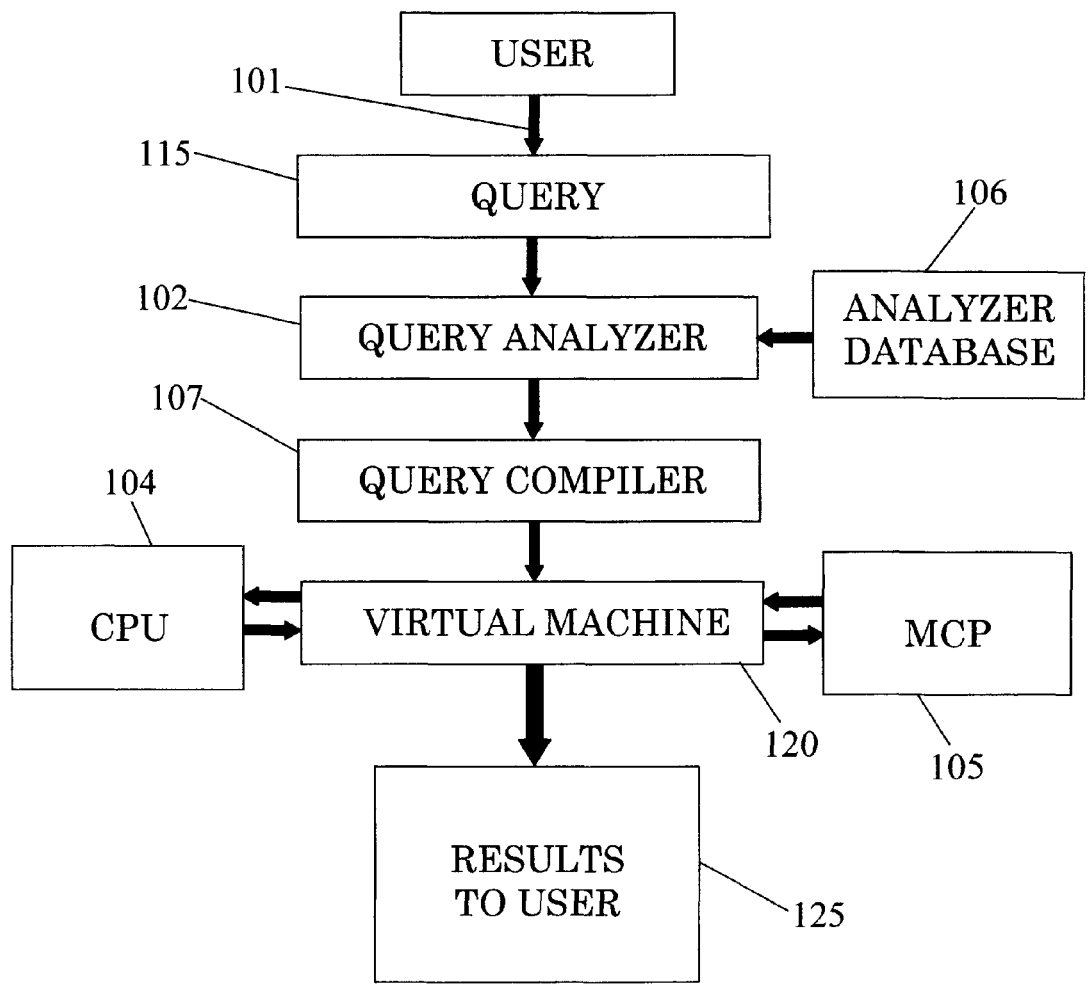
FIG. 1a illustrates in a block diagram form the general structure of the system of the present invention.

In the following description, for the purpose of illustration, numerous specific details are provided. As will be apparent to the skilled person, the invention is not limited to such specific details and the skilled person may devise alternative arrangements that are within the scope of this invention.

As previously mentioned, a hardware with many MCPs, e.g., a conventional GPU, high capacity GPU, sets of GPUs, or equivalent hardware which typically operates over hundreds of cores in parallel can provide an extremely fast processing for specific operations, particularly, but not limiting, those having a stream structure. However, thus far queries for databases could not be provided on MCPs without modifying the applications, namely, are intrusive, and as a result, queries for databases were limited to operate only with CPUs, that are typically limited to include very few cores.

The present invention is utilized by an application from the group of: BI (Business Intelligence), Reporting, DW (Data Warehouse), Logistics Systems, Weather Forecasting, sensor Networks with Wireless Sensor Networks as a private case, Cloud Application Services, Algo-trading, MRI Systems, Gaming Systems, Flight Control Systems, Resource Allocation Systems, Algorithmic Optimization Systems, ERP, SCM, CRM, Big-Data applications, Social Network Applications, etc.

The present invention overcomes the abovementioned limitations. More specifically, it is adapted to boost performance in large queries for databases and for data sets that are not residing on DBMS databases (e.g., data sets coming from MRI machines, weather sensors, traffic sensors, large sensor networks, any XML type/format data object, proprietary and binary types/formats data object, and text type/format data object, No-SQL datasets, etc). The present invention is adapted to enable parallel execution of queries over databases or large data sets operating one or more CPUs (which typically includes a few cores) and hardware with many (for example, hundreds) computational units. In this embodiment the hardware with many computational units is an MCP, however, equivalent hardware may be used. The invention is advantageous, as it can be provided as an add-on module of software which does not require any software or hardware modification to the conventional architecture of the DBMS and its associated application. The present invention is provided as a middleware module between the DBMS and the one or more CPUs and one or more MCPs.

All the queries that are typically provided in the prior art systems from the DBMS or the application to one or more CPUs are now analyzed and manipulated by the add-on module of the present invention, resulting in newly formatted sub-queries that are then distributed for parallel execution by the CPU and MCP. The module of the present invention analyzes each query, converts it to plurality of corresponding sub-queries, and assigns to each sub-query an address of a CPU or an MCP which is most appropriate in terms of efficiency of operation (time, power, and parallel processing). It has been found that utilizing the add-on module of the present invention (i.e., which utilizes a CPU and MCP in parallel) can provide query execution even 10 times faster (i.e., 1000 percent improvement in the performance) in comparison with the prior art structure which utilizes a CPU only.

FIG. 1a is a block diagram illustrating the structure of the module 100 of the present invention. The input to the system is a query process request 101 from the user. The query process request arrives at the query interceptor 115, which prevents the query execution in the conventional manner. The query interceptor 115 may be positioned within the DBMS, or before the DBMS. The intercepted query is then conveyed to query analyzer 102. In a first step, query analyzer 102 performs segmentation of the query, resulting in a list of several sub-queries 103, according to a query execution plan (QEP). The QEP is either provided by the DBMS or is generated by the query analyzer 102. When the query analyzer 102 generates the QEP, it uses its own analyzer database 106 to create the QEP. In a second step, query analyzer 102 computes a target value for each sub-query on said list. The target value is later used for addressing each specific sub-query to an appropriate processing unit, either CPU 104 or MCP 105.

The query compiler 107 accepts the list of sub-queries and the execution addresses from the query analyzer 102. The query compiler 120 forms an Abstract Syntax Tree (AST) only for the sub-queries that are targeted to the MCP 105. The AST contains all primitives that should be run on data provided by the DBMS to complete the query. The Query compiler 107 generates the code for primitives in the AST in OpenCL (or equivalent) format and uses an external compiler (NVCC, MSVC, GCC etc) to package them in a DLL or another library format capable for run time execution. After compiling the primitives to an executable form, the compiler conveys the execution tree (the execution tree is a special form of the AST which not only contains representation that orders commands/instructions to be executed on the MCP, but it also contains pointers to an executable code which is inserted by the query compiler 107 to the AST). This tree reveals to the virtual machine 120 dependencies between routines/primitives or various query parts. Each node in the tree contains information regarding the executable code to run, i.e., its name, location, input and output parameters). One function of the compiler 107 is to insert pointers to executable code to the AST in order to use different executable functions for one MCP primitive, depending on the data.

Example 1

"SELECT*FROM T1 ORDER BY T1.a"

Assuming T1.a has a string (char[N], varchar, etc.) type it may be preferred to use a bitonic sort on this string. Assuming T1.a has a float type, it may be preferred to use lexicographical sort. The decision is made based on run-time observations of performance (it depends on data which is operated and MCP on the type (single GPU, multiple GPUs, Knights Ferry/ Corner, etc.).

The virtual machine (VM) 120 receives the execution tree from query compiler 107. As noted above, the execution tree is constructed from both SQL sub queries intended for solely execution by the CPU 104 on the DBMS, and executable code created by query compiler 107 through AST for solely execution on the MCP 106. The VM 120 inserts this execution tree to a task bank (shown in FIG. 2). The task bank enables both in-order and out-of-order execution of primitives and DBMS sub-queries. The task bank now contains sub-queries for DBMS execution by the CPU 104, and those primitives that have been compiled by compiler 107 for execution by the MCP 105. Each compiled MCP primitive within the task bank works on data which is provided to him by a corresponding sub-query, which is in turn executed by the CPU 104. Therefore, each MCP primitive is essentially triggered by data which arrives from the DBMS by CPU 104. The VM 120 manages pre-allocated RAM buffers, each of those buffers may optionally be defined as a non-swappable and/or a write-combined memory region. At the moment that the data within the buffer is ready for a specific sub query, the MCP 105 begins to run the primitives from the task bank (shown in FIG. 2). A scheduler of the VM (also shown in FIG. 2) coordinates the primitive execution by the MCP 105, depending on the data readiness in the buffer. Once the results at the MCP 105 are ready, they are sent to a temporal results cache (shown in FIG. 2). The MCP 105 may still perform primitives on these results at the cache (if and whenever necessary). Upon readiness of the results, they are sent to the user.

Figure 1B:
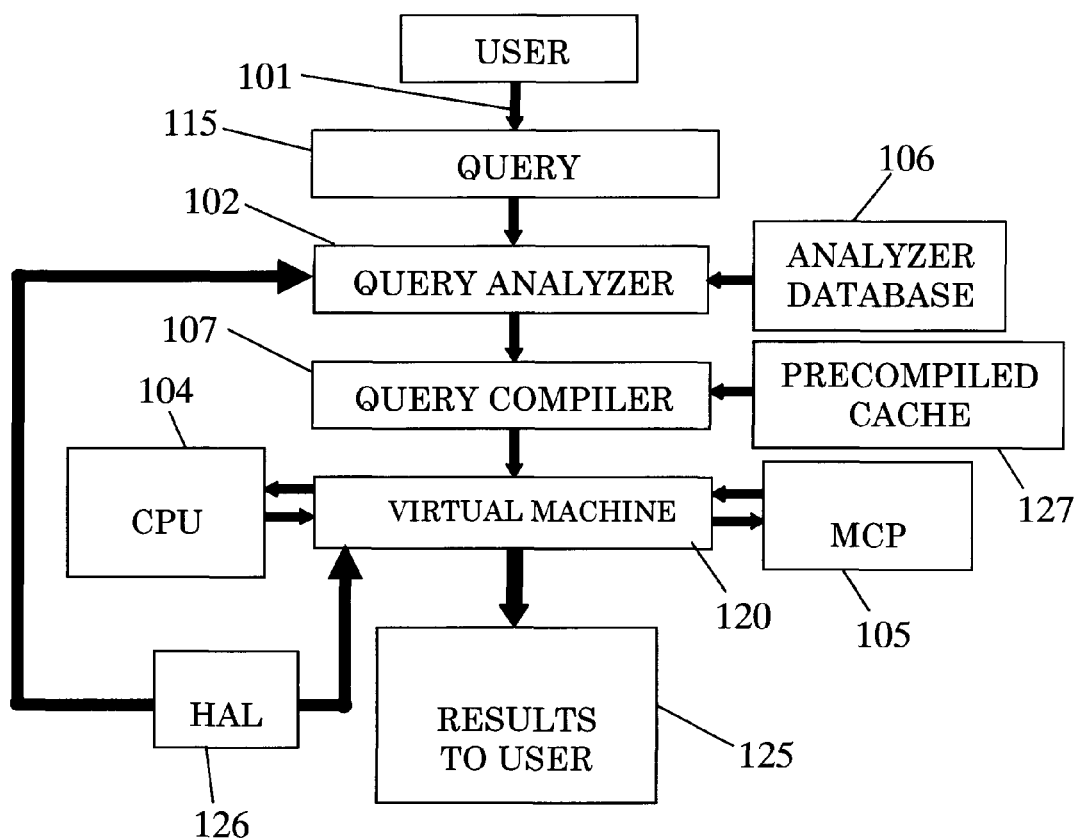

FIG. 1b describes in slightly more details the structure of the system of FIG. 1a. The system further comprises a pre-compiled cache 127, which stores all the MCP primitives that have already been compiled during previous runs. In such a manner, when a new MCP primitive arrives from the analyzer 102, the query compiler checks within the pre-compiled cache whether it contains an already compiled same primitive. If so, the compiled primitive is directly returned to the compiler, and embedded within the execution tree with no need for compilation. The system further comprises a Hardware Abstraction Layer (HAL) 126. The HAL monitors all the MCPs and its various cores, and determines which of them is available for performing new tasks from the task bank. The HAL reports its observations to query analyzer 102, to enable it to decide if the query should go to the CPU 104 or to the MCP 105. For example, if the HAL reports that all the MCPs are busy, the query analyzer 102 forwards the execution to the CPU 104 in a form of sub-query. In addition, the HAL reports to the virtual machine 120 about availability of MCP units to enable it to forward tasks from its task bank to an available MCP.

Interceptor 115 may be either internal or external to the DBMS. When the interceptor is internal, it catches the query by using its own DBMS driver (for example, OLEDB, or ODBC). When it is external, it allows the user to define its query as an argument to a stored procedure within the DBMS, or any other predefined function. As a result, the function or the procedure forwards the query to the query analyzer 102.

As mentioned, the query analyzer 102 decides whether the query should be performed by a CPU, a MCP or both. The query analyzer 102 comprises its own analyzer 106 database for estimating the query result-set size. The query analyzer may break the query to separate parts (sub-queries and MCP primitives) and assigns a target (CPU 104 or MCP 105) to each of them. It should be noted again that if the part of the query is found suitable for the CPU 104, it would be executed within the DBMS. In another option, the query analyzer 102 may request a query execution plan (QEP) from the DBMS and after parsing the QEP, it could decide what part of the query should be targeted to the CPU, and which part to the MCP.

Example 2

"select*from employees where salary <3000 order by salary", assuming salary is not the key and the analyzer database contains a histogram of, for example, 1000 bars, each bar is the amount of rows in a table with salary between the bar's boundaries. The result-set size can be estimated at a very high speed given the fact that running of 1000 threads simultaneously for each histogram is not at all a problem for an MCP. Each column in the table has the statistics stored in the above-mentioned bars, and in the case there is an AND operator between two columns, the system simply chooses a minimal number of rows from the two columns. In case the there is an OR between the two columns, the system sums up the results to obtain the estimated size. This size is used by the VM to allocate buffers in the memory of the MCP or within a RAM.

Example 3 a processing operation which is not supported by the MCP, is targeted to the CPU, a 'JOIN' operation over large databases which is expected to yield a large result (i.e., a result having a large number of elements), is targeted to the MCP, a 'select for update' operation which normally does not require much processing, is typically targeted to the CPU. If the query is simple, or contains DDL statements (e.g., insert, update, delete) it is sent directly to DBMS and executed in a regular manner (as all queries are executed without employing the present invention).

Analyzer database 106 stores in general database indexes, columnar statistics, distributions and optionally other data.

As mentioned, the query compiler 107 receives a query, and in turn forms an AST from it. The AST contains all the primitives that should run on data which is provided by the DBMS to complete the query. After preparation of the AST, (each node of the AST contains MCP one or more primitives) the compiler finds those MCP primitives that are ready within the pre-compiled cache 127, and inserts pointers to them within the AST. If the a primitive are not found in the pre-compiled cache 127, the compiler generates for it the code in OpenCL or equivalent, and saves it in precompiled cache 127 in a form of dll or any other format that enables run-time execution.

Figure 2:
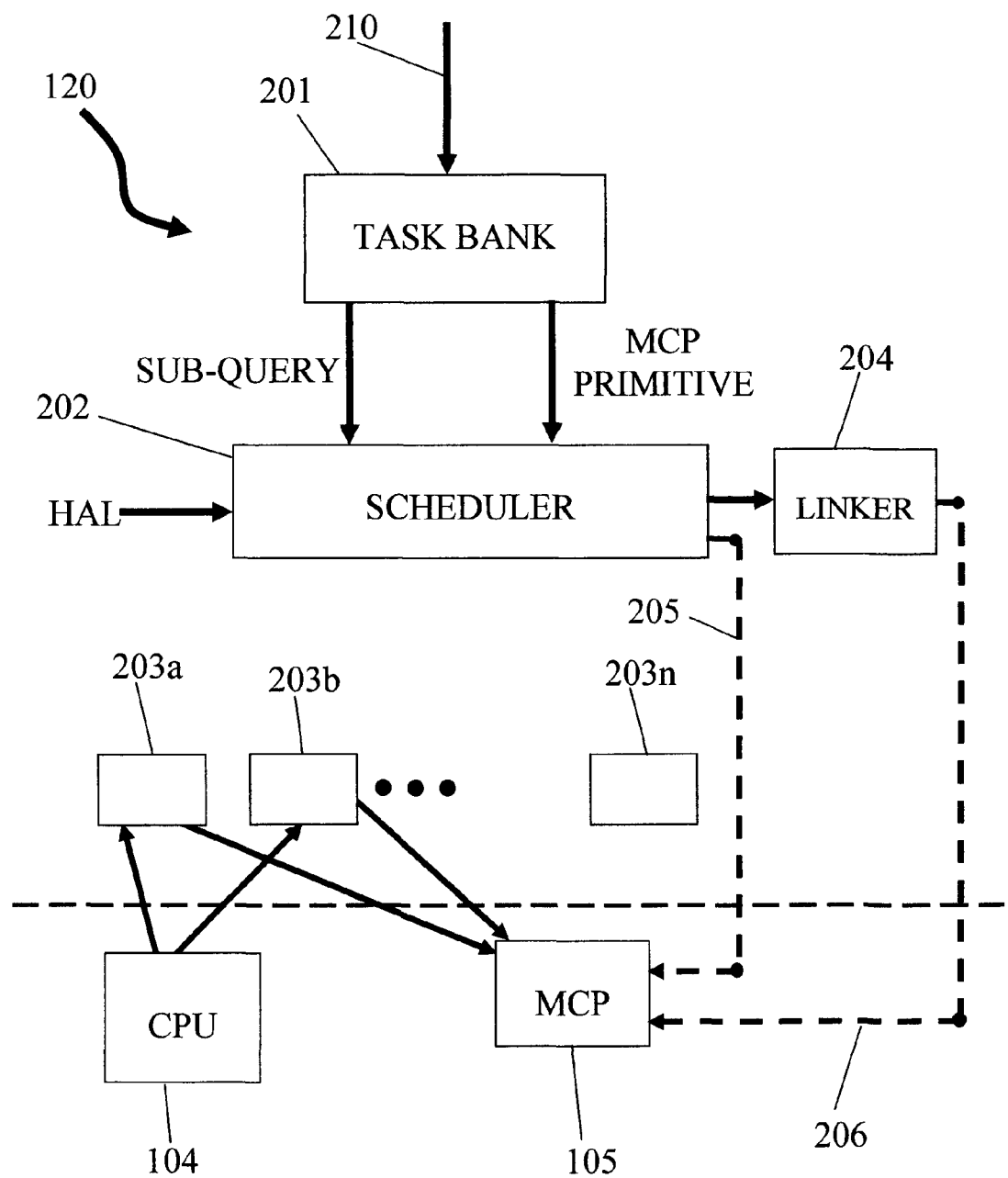
FIG. 2 illustrates in block diagram form the structure of the virtual machine of the system of the present invention.

FIG. 2 illustrates in block diagram form the structure of the virtual machine 120. After compiling the MCP primitives to an executable tree, the compiler 107 sends the execution tree 210 to the task bank 201. The task bank 201 enables out-of-order execution of primitives. Each primitive is triggered by sub-query signal to the scheduler 202 when one of the events occurs: either at the moment when the buffer 203i for a specific query becomes full of data from the DBMS, or when the DBMS has completed its transfer of data to a buffer. Buffers could be filled by executing a sub-query as a usual SQL query or by executing run-time library in the form of DLL or CLR or another run-time execution format. The scheduler 202 is responsible for the execution of the triggered primitives. The scheduler 202 may execute the pre-compiled code directly 205 or indirectly 206 by passing through linker 204 thereby enabling simultaneous execution of several primitives. The MCP is allocated by HAL 126 (see FIG. 1b).

As shown, the system of the present invention allows a significant increase of throughput in terms of "queries per hour". As also shown, the present invention does not require modification of the applications that transfer the query to the DBMS, and the DBMS is not required to modify its normal behavior in view of the existence of the MCP.

The following description provides still additional examples of cases in which querying by utilizing the structure of the present invention significantly reduces the query processing time.

Example 4 discloses a join operation over two large tables, namely, table 1, and table 2. This example is taken from a Business Intelligence (BI) application:

TABLE 1

Items Sales

| Product | Sales |
|---|---|
| TVset | 20 |
| Laptop | 30 |
| Ferrari (Car) | 0 |

TABLE 2

Items Price

| Product | Price ($) |
|---|---|
| TVset | 2 |
| Laptop | 3 |
| Ferrari (Car) | 1,000,000,000 |

In example 4, the task of the system of the present invention is to calculate the amount of money earned. Since it is assumed that the tables are not indexed, one possible optimization is to pre-sort the tables before a JOIN. The query for calculating the money earned is the multiplication of the number of items sold by their price. Thus, the query is:

"SELECT Price*Sales FROM table1, table2 WHERE table1.Product=table2.Product"

During the query, a JOIN algorithm is executed on table 1 and table 2. The execution of the JOIN over both a CPU 104 and an MCP 105, as in the present invention, yields a faster processing compared to performance of same execution by a DBMS over a CPU only. It should be noted that the example above discuss, for the sake of brevity, very small tables. However, in practice the tables are much larger by many orders, and the difference in processing time becomes very significant. In this example there is no need to issue any sub-query and the whole query is converted to MCP primitives performing JOIN. In the case of the following query: "SELECT Price*Sales FROM table1, table2 WHERE table1.Product=table2.Product AND Sales>20" there is an additional constraint "Sales>20" This filter operation ("where Sales>20") is clearly JO bounded and it can be performed on a CPU. Thus the sub-queries to get data from DBMS are:

1) "SELECT Product, PriceFROM table 1"
2) "SELECT Product, PriceFROM table2 WHERE Sales>20" The data from these two queries flow to buffers inside the VM 120. when the buffers become full or all the respective data from the DBMS are transferred to the VM buffers, the scheduler of the VM triggers the execution of MCP primitive JOIN (in this case) on an MCP unit.

Example 5

This example demonstrates the improvement in query results as obtained by utilizing the present invention. In this example a medical device MRI generates a stream of images. The images are stored in a conventional DBMS. The system of the present invention receives a query from a doctor which examines the patient's images. The doctor seeks for images in the DBMS in which there are areas in the patient's bone density which is lower then normal. The query of the doctor is transferred to system which in turn generates a continuous stream of images with areas marked as suspicious. The doctor's query is therefore executed over the images, yielding much faster results, as the query is executed over both an MCP and a CPU, compared to the traditional methods where the query is performed over a CPU only. Bone density and other medical parameters can be calculated by the use of image processing algorithms. This kind of algorithms performs very fast on GPUs (a private case of an MCP). It is possible to pass the images (assuming that they are stored in DBMS) for processing on GPUs via the system in present invention.

Example 6 describes the present invention work with a query execution plan from DBMS. A query execution plan is requested in the following example:

"SELECT employees.status, salary_data.salary FROM employees, salary_data WHERE employees.name=salary_data.name", (it is assumed that name is not the primary key). In this example, a JOIN occurs between two tables, and it is required to know which table to loop. For example, given that employees table contains 1000 rows, and salary_data only 10 rows, the join must loop on salary_data table (it will take only 10 iterations to complete the JOIN). The Linker 120 of the VM compacts several MCP primitives to one primitive, and sends it to execution.

Example 7 assume 2 Queries are Submitted

1) "SELECT * FROM T1 WHERE T1.a<5 ORDER BY T1.a"
2) "SELECT * FROM T2 WHERE T2.b<55 ORDER BY T2.b" Given the fact that MCP primitives are still in the task bank, they can be fused to on the execution unit through the linker, and executed together.

The system of the present invention, as demonstrated above, can be provided as a non intrusive system and as an automatic system. This is a significant advantage of the present invention.

The above examples and description have been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A non-intrusive add-on system for parallel execution of database queries over one or more Central Processing Units (CPUs), and one or more Multi Core Processors (MCPs), the system comprises:
   a) a query analyzer for receiving a query and creating a plurality of sub queries, by analyzing the query operations type, according to a query plan received from a Database Management System (DBMS), resulting in only newly formatted sub-queries to be executed in a DBMS query format, each sub-query containing multiple operators, and for computing and assigning to each sub-query a target address of at least one of a DBMS on a CPU and an MCP for execution based on which is more efficient for executing said sub-query;
   b) a query compiler for receiving said sub-queries from said query analyzer, creating an Abstract Syntax Tree (AST) and OpenCL primitives only for those sub-queries that are targeted to the MCP, and for conveying both the remaining sub-queries, and the AST and the OpenCL primitives to a Virtual Machine (VM); and
   c) the VM comprising:
      c1) a task bank for containing said received sub-queries that are targeted to the DBMS for execution and said received primitives that are targeted to said one or more MCPs;
      c2) one or more buffers for containing data resulting from executions of said sub-queries by said one or more CPUs; and
      c3) a scheduler for coordinating, in accordance with the query plan received from the DBMS, execution of said received primitives at the one or more MCPs, said scheduler triggers execution of each of said received primitives in response to receipt of corresponding data in said one or more buffers as a result of the execution of corresponding sub-queries by the one or more CPUs; and
      wherein said VM also combines said sub-query results from the DBMS and said primitive results from said MCPs to produce a final query result;
   wherein the query analyzer, the query compiler and the VM are carried out by at least one processor.

2. The system according to claim 1, further comprising a query interceptor for intercepting a query, and conveying the query to said analyzer.

3. The system according to claim 1, further comprising an analyzer database, said analyzer database being in communication with said analyzer, and containing data for assisting the analyzer in the assigning of said target addresses to said sub-queries.

4. The system according to claim 3, wherein the data which is stored in said analyzer database contains indexes, columnar statistics, and distributions.

5. The system according to claim 1, wherein the data readiness in said one or more buffers is the case when a buffer for specific query is full with data from the DBMS, or when the DBMS has completed transfer of data to said buffer.

6. The system according to claim 1, further comprising a pre-compiled cache for storing MCP primitives that have already been compiled during previous runs, thereby saving compilation time by the query compiler.

7. The system according to claim 1, further comprising a Hardware Abstraction Layer (HAL) for monitoring operation in real time of all said MCPs and cores of said MCPs, determining which of said MCPs that are available for performing new tasks, said determination is made each time when one said buffers is full with data from the DBMS, and reporting observations results to said query analyzer.

8. A non-intrusive method for the parallel execution of DBMS queries over one or more Central Processing Units (CPUs), and one or more Multi Core Processors (MCPs), the method comprises:
   a) receiving a query;
   b) creating a plurality of sub queries, by analyzing the query operations type, according to query plan received from a Database Management System (DBMS), resulting in only newly formatted sub-queries changed to DBMS query format, each sub-query containing multiple operators, and computing and assigning to each sub-query a target address of at least one of a DBMS on a CPU and an MCP for execution based on which is more efficient for executing said sub-query;
   c) creating from said plurality of sub-queries an Abstract Syntax Tree (AST) and OpenCL primitives only for those sub-queries that are targeted to the MCP, and conveying both the remaining sub-queries, and the AST and the OpenCL primitives to a virtual machine; and d) storing within a task bank said sub-queries that are targeted to one or more CPUs for DBMS execution, and said received primitives that are targeted to said MCP;
e) providing one or more buffers for containing data resulting from execution of said sub-queries by said DBMS;
f) coordinating, via a scheduler in accordance with the query plan received from the DBMS, execution of said primitives at the MCP, said scheduler triggers execution of each of said received primitives in response to receipt of corresponding data in said one or more buffers, as a result of the execution of corresponding sub-queries at the DBMS by one or more CPUs; and
g) combining said sub-query results from the DBMS and said primitives results from said MCP to produce a final query result.

* * * * *